United States Patent
Oh et al.

(10) Patent No.: US 11,495,797 B2
(45) Date of Patent: Nov. 8, 2022

(54) NEGATIVE ELECTRODE ACTIVE MATERIAL, NEGATIVE ELECTRODE INCLUDING THE SAME, SECONDARY BATTERY INCLUDING THE NEGATIVE ELECTRODE, AND PREPARATION METHOD OF THE NEGATIVE ELECTRODE ACTIVE MATERIAL

(71) Applicant: LG CHEM, LTD., Seoul (KR)

(72) Inventors: Il Geun Oh, Daejeon (KR); Eun Kyung Kim, Daejeon (KR); Yong Ju Lee, Daejeon (KR); Rae Hwan Jo, Daejeon (KR); Su Min Lee, Daejeon (KR); Jung Hyun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 268 days.

(21) Appl. No.: 16/761,662

(22) PCT Filed: Nov. 6, 2018

(86) PCT No.: PCT/KR2018/013413
§ 371 (c)(1),
(2) Date: May 5, 2020

(87) PCT Pub. No.: WO2019/088808
PCT Pub. Date: May 9, 2019

(65) Prior Publication Data
US 2021/0184216 A1     Jun. 17, 2021

(30) Foreign Application Priority Data

Nov. 6, 2017   (KR) .......................... 10-2017-0146923

(51) Int. Cl.
*H01M 4/587*   (2010.01)
*H01M 4/04*    (2006.01)
*H01M 4/38*    (2006.01)
*H01M 4/02*    (2006.01)

(52) U.S. Cl.
CPC ......... *H01M 4/587* (2013.01); *H01M 4/0471* (2013.01); *H01M 4/386* (2013.01); *H01M 2004/027* (2013.01)

(58) Field of Classification Search
CPC .... H01M 4/587; H01M 4/0471; H01M 4/386; H01M 2004/027
See application file for complete search history.

(56) References Cited

U.S. PATENT DOCUMENTS

| | | |
|---|---|---|
| 5,139,719 A | 8/1992 | Winder |
| 2009/0291371 A1 | 11/2009 | Konishiike et al. |
| 2012/0070745 A1 | 3/2012 | Ishida et al. |
| 2012/0107693 A1 | 5/2012 | Ishida et al. |
| 2013/0115517 A1 | 5/2013 | Kim et al. |
| 2013/0177813 A1 | 7/2013 | Kim et al. |
| 2014/0087268 A1 | 3/2014 | Kim et al. |
| 2015/0017525 A1* | 1/2015 | Lee ............... H01M 4/0471 252/182.1 |
| 2017/0338481 A1 | 11/2017 | Greulich-Weber |

FOREIGN PATENT DOCUMENTS

| | | |
|---|---|---|
| CN | 101171710 A | 4/2008 |
| CN | 102403497 A | 4/2012 |
| CN | 107001052 A | 8/2017 |
| JP | 2002-56843 A | 2/2002 |
| JP | 2004-303593 A | 10/2004 |
| JP | 2016-152213 A | 8/2016 |
| KR | 10-1998-7001045 A | 4/1998 |
| KR | 10-2009-0122116 A | 11/2009 |
| KR | 10-2012-0029317 A | 3/2012 |
| KR | 10-2012-0044043 A | 5/2012 |
| KR | 10-2013-0050704 A | 5/2013 |
| KR | 10-2014-0012588 A | 2/2014 |
| KR | 10-1371555 B1 | 3/2014 |
| KR | 10-2015-0112746 A | 10/2015 |
| KR | 10-2017-0051739 A | 5/2017 |
| KR | 10-1733736 B1 | 5/2017 |
| KR | 10-2017-0084280 A | 7/2017 |

OTHER PUBLICATIONS

International Search Report for PCT/KR2018/013413 dated Apr. 12, 2019.
European Patent Office Search Report dated Nov. 6, 2020 for EP Application No. 18873013.9.

* cited by examiner

*Primary Examiner* — James Lee
(74) *Attorney, Agent, or Firm* — Birch, Stewart, Kolasch & Birch, LLP

(57) ABSTRACT

A negative electrode active material including a silicon-carbon-based particle, the silicon-carbon-based particle having a $SiC_x$ matrix and boron doped in the $SiC_x$ matrix, wherein x of the $SiC_x$ matrix is 0.3 or more and less than 0.6.

14 Claims, No Drawings

NEGATIVE ELECTRODE ACTIVE MATERIAL, NEGATIVE ELECTRODE INCLUDING THE SAME, SECONDARY BATTERY INCLUDING THE NEGATIVE ELECTRODE, AND PREPARATION METHOD OF THE NEGATIVE ELECTRODE ACTIVE MATERIAL

CROSS-REFERENCE TO RELATED APPLICATIONS

This application claims the benefit of Korean Patent Application No. 10-2017-0146923, filed on Nov. 6, 2017, in the Korean Intellectual Property Office, the disclosure of which is incorporated herein in its entirety by reference.

TECHNICAL FIELD

The present invention relates to a negative electrode active material, a negative electrode including the same, a secondary battery including the negative electrode, and a preparation method of the negative electrode active material. Specifically, the negative electrode active material may include a silicon-carbon-based particle having a $SiC_x$ matrix and boron doped in the $SiC_x$ matrix, wherein the x of the $SiC_x$ matrix is 0.3 or more and less than 0.6.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having high energy density, that is lithium secondary batteries having high capacity, have been subjected to considerable research and also have been commercialized and widely used.

In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a silicon-based particle having high discharge capacity may be used. However, $SiO_2$ of a silicon-based particle such as $SiO_x$ (0≤x<2) reacts with Li ions generated from the positive electrode during charging and forms irreversible lithium silicate. Therefore, the initial efficiency of the battery is low. In addition, a silicon-based particle such as $SiO_x$ (0≤x<2) changes in volume excessively during charging and discharging and has low electrical conductivity, so that there is a problem that the lifespan of the battery is deteriorated.

Typically, in order to solve such a problem, techniques for forming a coating layer on the surface of a silicon-based particle have been used. Specifically, there is a method for forming a carbon coating layer on the surface of a silicon-based particle (Korean Patent Laid-Open Publication No. 10-2015-0112746). However, even if the carbon coating layer is formed, it is difficult to control the formation of an irreversible phase, and even when the carbon coating layer is formed, the effect of reducing battery resistance is not great.

Therefore, there is a demand for a negative electrode active material which can replace $SiO_x$(0≤x<2) while improving the initial efficiency, capacity, and lifespan characteristics of a battery.

PRIOR ART DOCUMENT

Patent Document (Patent Document 1) Korean Patent Laid-Open Publication No. 10-2015-0112746

DISCLOSURE OF THE INVENTION

Technical Problem

An aspect of the present invention provides a negative electrode active material which is capable of suppressing an irreversible reaction during the reaction of a battery, thereby improving initial efficiency, and which is excellent in electrical conductivity, mechanical strength and chemical stability, thereby improving capacity and lifespan characteristics of the battery.

Technical Solution

According to an aspect of the present invention, there is provided a negative electrode active material including a silicon-carbon-based particle, the silicon-carbon-based particle having a $SiC_x$ matrix and boron doped in the $SiC_x$ matrix, wherein the x of the $SiC_x$ matrix is 0.3 or more and less than 0.6.

According to another aspect of the present invention, there are provided a negative electrode including the negative electrode active material, and a secondary battery including the negative electrode.

According to another aspect of the present invention, there is provided a method for preparing a negative electrode active material, the method including forming a matrix fluid by performing a first heat treatment wherein vaporized silicon source, carbon source, and carrier gas are introduced into a first reaction furnace, and reacting the matrix fluid and boron in the gaseous state to form a $SiC_x$ matrix doped with boron, wherein the x of the $SiC_x$ matrix is 0.3 or more and less than 0.6.

Advantageous Effects

According to the present invention, the initial efficiency of a battery can be improved by minimizing the generation of irreversible phase during charging and discharging of the battery by a $SiC_x$ matrix included in a negative electrode active material. In addition, since electrical conductivity, physical strength, and chemical stability are improved by the $SiC_x$ matrix, the capacity and lifespan characteristics of the battery can be improved. At the same time, since boron is doped in the $SiC_x$ matrix, the electrical conductivity can be further improved, thereby further improving the capacity and lifespan characteristics of the battery.

MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode active material according to an embodiment of the present invention includes a silicon-carbon-based particle having a $SiC_x$ matrix and boron doped in the $SiC_x$ matrix, wherein the x of the $SiC_x$ matrix may be 0.3 or more and less than 0.6.

The silicon-carbon-based particle may include a $SiC_x$ matrix and boron.

The $SiC_x$ matrix may include SiC and Si. Typically, $SiO_x(0 \leq x<2)$, which is a silicon-based particle used as a negative electrode active material, generates an irreversible phase when a battery is driven by $SiO_2$ included in $SiO_x$ ($0 \leq x<2$). Accordingly, the initial efficiency of the battery is low. In addition, the $SiO_x(0 \leq x<2)$ is low in physical strength and chemical stability, and thus the volume of the negative electrode changes excessively during charging and discharging of the battery. In addition, the electric conductivity of the $SiO_x(0 \leq x<2)$ is low. Therefore, in the case of a battery using $SiO_x(0 \leq x<2)$, the capacity and lifespan thereof are deteriorated. However, since the $SiC_x$ matrix does not include $SiO_2$, the generation of irreversible phase may be minimized, and when a negative electrode active material including the $SiC_x$ matrix is used, the initial efficiency of a battery may be improved. In addition, the $SiC_x$ matrix is excellent in physical strength and chemical stability, the degree of volume expansion of the battery during charging and discharging is smaller when compared with a battery using $SiO_x(0 \leq x<2)$. In addition, the $SiC_x$ matrix is excellent in electrical conductivity when compared with $SiOx(0 \leq x<2)$, so that the capacity and lifespan characteristics of the battery may be improved when using the negative electrode active material including the $SiC_x$ matrix.

The x of the $SiC_x$ matrix corresponds to the number ratio of C to Si included in the $SiC_x$ matrix. The x of the $SiC_x$ matrix may be 0.3 or more and less than 0.6, specifically 0.3 or more and less than 0.55, and more specifically 0.4 or more and less than 0.5. When the x is less than 0.3, there arise problems that the electrical conductivity is lowered due to the excessive Si content, a side reaction with an electrolyte occurs due to Si that does not maintain the bonding relation with carbon, and the volume of the electrode is excessively increased during charging and discharging of a battery due to the Si. On the other hand, when the x is 0.6 or more, the Si content is too small, and thus the battery capacity is excessively reduced. Considering the range of the x, the $SiC_x$ matrix of the negative electrode active material of the present invention is distinguished from a typical silicon-carbon-based (SiC). In the case of SiC, the number ratio of Si and C is 1:1, whereas the $SiC_x$ matrix may include Si to a number greater than that of C. Accordingly, when the $SiC_x$ matrix is used instead of chemically stable SiC, the capacity may be improved.

The $SiC_x$ matrix may be in the form of a particle.

The boron may be present in the $SiC_x$ matrix in a doped state, specifically may be placed inside the $SiC_x$ matrix, and more specifically may be uniformly placed inside the $SiC_x$ matrix. The boron being doped in the $SiC_x$ matrix corresponds to p-type doping. Therefore, the electrical conductivity of the negative electrode active material may be improved by the boron.

The boron may be included in an amount of 0.5 wt % to 1 wt % based on the total weight of the silicon-carbon based particle, specifically 0.5 wt % to 0.9 wt %, and more specifically 0.5 wt % to 0.8 wt %. When the range of 0.5 wt % to 1 wt % based on the total weight of the silicon-carbon based particle is satisfied, the electrical conductivity of the negative electrode active material may be further improved, and the capacity per weight of the negative electrode active material may be maintained at an appropriate level. The content of the boron may be confirmed by an ICP method.

The average particle diameter ($D_{50}$) of the silicon-carbon-based particles may be from 1 μm to 10 μm, specifically from 1 μm to 7 μm, and more specifically from 1 μm to 6 μm. When the range of 1 μm to 10 μm is satisfied, the diffusion resistance of an electrolyte may be reduced. In the present specification, the average particle diameter ($D_{50}$) may be defined as a particle diameter corresponding to 50% of the volume accumulation in a particle diameter distribution curve. The average particle diameter ($D_{50}$) may be measured by using, for example, a laser diffraction method. The laser diffraction method generally enables measurement of a particle diameter of several millimeters from a sub-micron region, so that results of high reproducibility and high resolution may be obtained.

A negative electrode according to another embodiment of the present invention may include a negative electrode active material, and in this case, the negative electrode active material may be the same as the negative electrode active material of the above-described embodiment. Specifically, the negative electrode may include a current collector and a negative electrode active material layer disposed on the current collector. The negative electrode active material layer may include the negative electrode active material. Furthermore, the negative electrode active material layer may include a binder and/or a conductive material.

The current collector is not particularly limited as long as it has conductivity without causing a chemical change in the battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon such as copper and nickel well may be used as the current collector. The thickness of the current collector may be from 6 μm to 20 μm, but the thickness of the current collector is not limited thereto.

The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, poly acrylic acid, materials having the hydrogen thereof substituted with Li, Na, or Ca, and the like, and a combination thereof. In addition, the binder may include various copolymers thereof.

The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used.

A negative electrode according to another embodiment of the present invention is the same as the negative electrode described above except that the negative electrode active material layer further includes a graphite-based active material in addition to the negative electrode active material of the embodiment described above. Hereinafter, the present invention will be described with reference to the above difference.

By using the graphite-based active material together with the silicon-carbon-based particles, the charge and discharge characteristics of the battery may be improved. The graphite-based active material particle may be one or more selected from the group consisting of artificial graphite, natural graphite, graphitized carbon fiber, and graphitized mesocarbon microbeads.

A secondary battery according to another embodiment of the present invention may include a negative electrode, a positive electrode, a separator interposed between the positive electrode and the negative electrode, and an electrolyte. The negative electrode is the same as the negative electrode described above. Since the negative electrode has been described above, the detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be prepared on the surface of the positive electrode current collector to improve the adhesion of the positive electrode active material. The positive electrode current collector may be used in various forms of such as a film, a sheet, a foil, a net, a porous body, a foam, and a non-woven body.

The positive electrode active material may be a positive electrode active material commonly used in the art. Specifically, the positive electrode active material may be a layered compound such as lithium cobalt oxide ($LiCoO_2$) and lithium nickel oxide ($LiNiO_2$), or a compound substituted with one or more transition metals; a lithium manganese oxide such as $Li_{1+c1}Mn_{2-c1}O_4$ (0≤c1≤0.33), $LiMnO_3$, $LiMn_2O_3$, and $LiMnO_2$; lithium copper oxide ($Li_2CuO_2$); a vanadium oxide such as); $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and 0.01≤c2≤0.3); a lithium manganese composite oxide represented by the formula $LiMn_{2-c3}M_{c3}O_2$ (wherein, M is any one of Co, Ni, Fe, Cr, Zn, or Ta, and 0.01≤c3≤0.1), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used.

In addition, the binder serves to improve the bonding between positive electrode active material particles and the adhesion between the positive electrode active material and the positive electrode current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, ethylene carbonate and propylene carbonate which are cyclic carbonates, may be preferably used since they are organic solvents of a high viscosity having high permittivity to dissociate a lithium salt well. Furthermore, such a cyclic carbonate may be more preferably used since the cyclic carbonate may be mixed with a linear carbonate of a low viscosity and low permittivity such as dimethyl carbonate and diethyl carbonate in an appropriate ratio to prepare an electrolyte having a high electric conductivity.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan characteristics of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to another embodiment of the present invention, a battery module including the secondary battery as a unit cell, and a battery pack including the same are provided. The battery module and the battery pack include the secondary battery which has high capacity, high rate characteristics, and cycle characteristics, and thus, may be used as a power source of a medium-and-large sized device selected from the group consisting of an electric vehicle, a hybrid electric vehicle, a plug-in hybrid electric vehicle, and a power storage system.

A method for preparing a negative electrode active material according to another embodiment of the present invention includes forming a matrix fluid through a first heat treatment by introducing vaporized silicon source, carbon source, and carrier gas into a first reaction furnace, and forming a $SiC_x$ matrix doped with boron by reacting the matrix fluid and boron in the gaseous state, wherein the x of the $SiC_x$ matrix is 0.3 or more and less than 0.6.

In the forming of a matrix fluid, the vaporized silicon source may be obtained by heat-treating a silicon source to a high temperature and vaporizing the same. At this time, the silicon source may be at least any one selected from the group consisting of silicon (Pure Si), silane, and trichloro silane. The carbon source may be in the gaseous state. The carbon source may be at least any one selected from the group consisting of methane, ethylene, acetylene, and methylene. Specifically, the silicon source may be silicon and the carbon source may be methane, and in this case, high purity Si and C may be supplied to the first reaction furnace.

The carrier gas may be an inert gas. Specifically, the carrier gas may be at least any one selected from the group consisting of Ar, He, and Ne, and more specifically may be Ar. The matrix fluid formed by the carrier gas may be discharged from the first reaction furnace toward a second reaction furnace to be described later.

In the forming of a matrix fluid, the vaporized silicon source and the carbon source may be introduced into the first reaction furnace, and react with each other by a first heat treatment temperature.

The inflow rate of the vaporized silicon source may be from 100 sccm to 300 sccm, and specifically from 100 sccm to 200 sccm. The inflow rate of the carbon source may be from 30 sccm to 180 sccm, and specifically from 30 sccm to 120 sccm. The inflow rate of the carrier gas may be from 550 sccm to 3000 sccm, and specifically from 1000 sccm to 3000 sccm.

The ratio of the inflow rate of the vaporized silicon source to the inflow rate of the carbon source may be 1:0.3 to 1:0.6, and preferably, 1:0.35 to 1:0.5. When the above range is satisfied, a $SiC_x$ matrix having x of 0.3 or more and less than 0.6 may be formed, so that the electric conductivity of the negative electrode active material may be increased and the capacity of the secondary battery may be improved.

The first heat treatment may be performed at a temperature of 1500° C. to 2500° C., specifically 1800° C. to 2300° C., and more specifically 1900° C. to 2200° C. When the above range is satisfied, the carbon source may be stably decomposed so that carbon may be smoothly supplied.

The formed matrix fluid may include a small-sized $SiC_x$ ($0.3 \leq x < 0.6$).

In the forming of a $SiC_x$ matrix doped with boron may include performing a second heat treatment by introducing the matrix fluid and the boron in the gaseous state into a second reaction furnace.

The second reaction furnace may be connected to the first reaction furnace. Specifically, the first reaction furnace and the second reaction furnace may be the same reaction furnace divided into sections. More specifically, the first reaction furnace and the second reaction furnace may both be tubular reaction furnaces, and the first reaction furnace and the second reaction furnace may respectively represent one section of the tubular reaction furnace.

In the forming a $SiC_x$ matrix doped with boron, the ratio of the inflow rate of the matrix fluid to the inflow rate of the boron in the gaseous state may be 300:1 to 600:1, specifically 300:1 to 500:1, and more specifically 350:1 to 500:1. When the above range is satisfied, the boron in the $SiC_x$ matrix may be dispersed evenly without being agglomerated with each other.

The second heat treatment may be performed at a temperature of 2000° C. to 2800° C., specifically 2300° C. to 2700° C., and more specifically 2400° C. to 2600° C. When the above range is satisfied, the small-sized $SiC_x$ ($0.3 \leq x < 0.6$)

may grow or aggregate with each other so that a $SiC_x$ matrix of a desired size may be formed, and at the same time the boron may be effectively doped into the inside of $SiC_x$ matrix.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Preparation of Battery (1) Preparation of Silicon-Carbon-Based Particles
1) Formation of Matrix Fluid Silicon (Pure Si) was used as a silicon source, methane gas was used as a carbon source, and Ar was used as a carrier gas. The silicon was vaporized and introduced into a tubular furnace (a first reaction furnace), and was subjected to a heat treatment for a period of 80 cm by maintaining the temperature in the first reaction furnace at 2000° C. At this time, the inflow rate of the vaporized silicon was 200 sccm, the inflow rate of the methane gas was 100 sccm, and the inflow rate of the Ar gas was 1500 sccm. As a result, a matrix fluid was formed.

2) Doping Boron

Next, the matrix fluid and boron in the gaseous state were introduced into a tube (a second reaction furnace) maintained 2400° C., and were allowed to pass 80 cm therethrough. At this time, the inflow rate of the matrix fluid was 1800 sccm, and the inflow rate of the boron in the gaseous state was 5 sccm. As a result, silicon-carbon-based particles having a $SiC_x$ matrix doped with boron were formed. At this time, the content of boron confirmed by ICP was 0.53 wt % based on the total weight of the silicon-carbon-based particles. In addition, the average diameter ($D_{50}$) of the silicon-carbon-based particles confirmed by a laser diffraction method was 5 μm. At this time, x confirmed by XRD quantitative analysis was 0.47.

(2) Preparation of Negative Electrode

The silicon-carbon-based active material particle prepared above, graphite, carbon black as a conductive material, carboxymethyl cellulose (CMC) as a binder, and styrene butadiene rubber (SBR) were mixed in a weight ratio of 4.8:91:1:1.7:1.5 to prepare a mixture of 5 g. 28.9 of distilled water was added to the mixture to prepare a negative electrode slurry. The negative electrode slurry was applied on a copper (Cu) metal thin film having a thickness of 20 μm, which is a negative electrode current collector, and then dried. At this time, the temperature of circulated air was 60° C. Thereafter, the copper (Cu) metal thin film applied with the negative electrode slurry and then dried was rolled and dried in a vacuum oven at 130° C. for 12 hours, and then punched into a circular shape of 1.4875 cm² to prepare a negative electrode.

(3) Preparation of Secondary Battery

A lithium (Li) metal thin film, which was prepared by cutting the prepared negative electrode into a circular shape of 1.7671 cm², was prepared as a positive electrode. A porous polyethylene separator was interposed between the positive electrode and the negative electrode, and then vinylene carbonate dissolved in 0.5 wt % was dissolved in a mixed solution in which methyl ethyl carbonate (EMC) and ethylene carbonate (EC) are mixed in a mixing volume ratio of 7:3. Thereafter, an electrolyte in which $LiPF_6$ of 1.0 M concentration is dissolved was injected to manufacture a lithium coin half-cell.

Example 2: Preparation of Battery (1) Preparation of Matrix Fluid
1) Formation of Matrix Fluid A matrix fluid was prepared in the same manner as in Example 1.

2) Doping Boron

Next, the matrix fluid and boron in the gaseous state were introduced into a tube (a second reaction furnace) maintained 2400° C., and were allowed to pass 80 cm therethrough. At this time, the inflow rate of the matrix fluid was 1800 sccm, and the inflow rate of the boron in the gaseous state was 0.5 sccm. As a result, silicon-carbon-based particles having a $SiC_x$ matrix doped with boron were formed. At this time, the content of boron confirmed by ICP was 0.06 wt % based on the total weight of the silicon-carbon-based particles. In addition, the average diameter ($D_{50}$) of the silicon-carbon-based particles confirmed by a laser diffraction method was 5 μm. At this time, x confirmed by XRD quantitative analysis was 0.47.

(2) Preparation of Negative Electrode and Secondary Battery

A negative electrode and a secondary battery were prepared in the same manner as in Example 1 except that the silicon-carbon-based particle prepared above was used.

Example 3: Preparation of Battery (1) Preparation of Silicon-Carbon-Based Particles
1) Formation of Matrix Fluid A matrix fluid was formed in the same manner as in Example 1.

2) Doping Boron

Next, the matrix fluid and boron in the gaseous state were introduced into a tube (a second reaction furnace) maintained 2400° C., and were allowed to pass 80 cm therethrough. At this time, the inflow rate of the matrix fluid was 1800 sccm, and the inflow rate of the boron in the gaseous state was 30 sccm. As a result, silicon-carbon-based particles having a $SiC_x$ matrix doped with boron were formed. At this time, the content of boron confirmed by ICP was 3.2 wt % based on the total weight of the silicon-carbon-based particles. In addition, the average diameter ($D_{50}$) of the silicon-carbon-based particles confirmed by a laser diffraction method was 6 μm. At this time, x confirmed by XRD quantitative analysis was 0.47.

(2) Preparation of Negative Electrode and Secondary Battery

A negative electrode and a secondary battery were prepared in the same manner as in Example 1 except that the silicon-carbon-based particles prepared above were used.

Comparative Example 1

Silicon-carbon-based particles, a negative electrode, and a secondary battery were prepared in the same manner as in Example 1 except that boron gas was not introduced.

Comparative Example 2

(1) Preparation of Silicon-Carbon-Based Particles

Silicon-carbon-based particles of Comparative Example 2 were prepared in the same manner as in Example 1 except that the inflow rate of the methane gas in Example 1 was 50 sccm.

At this time, the content of boron confirmed by ICP was 0.54 wt % based on the total weight of the silicon-carbon-based particles. In addition, the average diameter ($D_{50}$) of the silicon-carbon-based particles confirmed by a laser diffraction method was 5 μm. At this time, x confirmed by XRD quantitative analysis was 0.24.

(2) Preparation of Negative Electrode and Secondary Battery

A negative electrode and a secondary battery were prepared in the same manner as in Example 1 except that the silicon-carbon-based particles prepared above were used.

Comparative Example 3

(1) Preparation of Silicon-Carbon-Based Particles

Silicon-carbon-based particles of Comparative Example 2 were prepared in the same manner as in Example 1 except that the inflow rate of the methane gas in Example 1 was 160 sccm.

At this time, the content of boron confirmed by ICP was 0.51 wt % based on the total weight of the silicon-carbon-based particles. In addition, the average diameter ($D_{50}$) of the silicon-carbon-based particles confirmed by a laser diffraction method was 5 μm. At this time, x confirmed by XRD quantitative analysis was 0.8.

(2) Preparation of Negative Electrode and Secondary Battery

A negative electrode and a secondary battery were prepared in the same manner as in Example 1 except that the silicon-carbon-based particles prepared above were used.

Comparative Example 4

A negative electrode active material, a negative electrode, and a secondary battery were prepared in the same manner as in Example 1 except that SiO was used instead of the silicon-carbon-based particles of Example 1, and boron was not doped.

Comparative Example 5

(1) Preparation of SiO Doped with Boron 10 g of SiO and 0.05 g of boron were mixed and then heat-treated at 2400° C. for 1 hour to form SiO particles having a SiO matrix doped with boron. At this time, the content of boron confirmed by ICP was 0.5 wt % based on the total weight of the particles. In addition, the average diameter ($D_{50}$) of the particles confirmed by PSD was 5 μm.

(2) Preparation of Negative Electrode and Secondary Battery

A negative electrode and a secondary battery were prepared in the same manner as in Example 1 except that the SiO particles doped with boron prepared above were used.

Experimental Example 1: Evaluation of Discharge Capacity, Initial Efficiency, Capacity Retention Rate and Electrode Thickness Change Rate The batteries of Examples 1 to 3 and Comparative Examples 1 to 5 were subjected to charging and discharging to evaluate discharge capacity, initial efficiency, capacity retention rate, and electrode thickness change rate, and the results are shown in Table 1 below.

Meanwhile, for the first cycle and the second cycle, charging.discharging were performed at 0.1 C, and from the third cycle to the 49th cycle, charging.discharging were performed at 0.5 C. The 50th cycle was terminated in the state of charging (the state in which lithium was in the negative electrode), and then the battery was disassembled and the thickness thereof was measured to calculate the electrode thickness change rate.

Charging condition: CC(constant current)/CV(constant voltage) (5 mV/0.005C current cut-off)

Discharging condition: CC(constant current) Condition 1.5V

The discharge capacity (mAh/g) and the initial efficiency (%) were derived from the result of one charge/discharge. Specifically, the initial efficiency (%) was derived by the following calculation.

Initial efficiency (%)=(discharge capacity after 1 discharge/charge capacity of 1 time)×100

The capacity retention rate and the electrode thickness change rate were derived by the following calculations, respectively.

Capacity retention rate (%)=(discharge capacity of 49 times/discharge capacity of 1 time)×100

Electrode thickness change rate (%)=(final negative electrode thickness variation/initial negative electrode thickness)×100

TABLE 1

| Battery | Boron content (wt %) | x value of $SiC_x$ | Discharge capacity (mAh/g) | Initial efficiency (%) | Capacity retention rate (%) | Electrode thickness change rate (5) |
|---|---|---|---|---|---|---|
| Example 1 | 0.53 | 0.47 | 407 | 91.4 | 84.2 | 38.8 |
| Example 2 | 0.06 | 0.47 | 405 | 90.9 | 80.1 | 40.4 |
| Example 3 | 3.2 | 0.47 | 404 | 91.1 | 82.5 | 40.2 |
| Comparative Example 1 | 0 | 0.47 | 407 | 90.4 | 77.1 | 45.4 |
| Comparative Example 2 | 0.54 | 0.24 | 409 | 89.5 | 70.5 | 55.1 |
| Comparative Example 3 | 0.51 | 0.8 | 380 | 91.3 | 85.1 | 35.1 |
| Comparative Example 4 | 0 | — | 394 | 88.4 | 70.2 | 58.7 |
| Comparative Example 5 | 0.5 | — | 395 | 89.1 | 71.4 | 60.2 |

Referring to Table 1, in the case of Examples 1 to 3, the discharge capacity, the initial efficiency and the capacity retention rate are all high, and the electrode thickness change rate is low. On the other hand, in the case of Comparative Example 1, the boron was not doped, and thus the electrical conductivity was deteriorated. Therefore, the initial efficiency and the capacity retention rate were deteriorated, and the electrode thickness change rate was high. In the case of Comparative Example 2, the Si content was too high, and thus the initial efficiency and the capacity retention rate were deteriorated due to a side reaction of the electrolyte, and the electrode thickness change rate was high. In the case of Comparative Example 3, the Si content was too small, and thus the discharge capacity was very low. That is, when boron was doped while satisfying an appropriate level of x value in the $SiC_x$ matrix, the discharge capacity, the initial efficiency and the capacity retention rate were all high, and the electrode thickness change rate was low. In addition, in Comparative Example 4 and Comparative Example 5 in which SiO was used instead of the $SiC_x$ matrix of the present invention, the electrode thickness change rate was too high, and the discharge capacity, the initial efficiency, and the capacity retention rate were all low.

The invention claimed is:

1. A negative electrode active material, comprising:
a silicon-carbon-based particle, wherein the silicon-carbon-based particle comprises:
 a $SiC_x$ matrix; and
 boron doped in the $SiC_x$ matrix,
wherein x of the $SiC_x$ matrix is 0.3 or more and less than 0.6, and
wherein the boron is present in an amount of 0.5 wt % to 1 wt % based on a total weight of the silicon-carbon-based particle.

2. The negative electrode active material of claim 1, wherein an average particle diameter ($D_{50}$) of the silicon-carbon-based particles is 1 μm to 10 μm.

3. The negative electrode active material of claim 1, wherein the $SiC_x$ matrix comprises SiC and Si.

4. The negative electrode active material of claim 1, wherein the boron is present inside the $SiC_x$ matrix.

5. A negative electrode comprising the negative electrode active material of claim 1.

6. The negative electrode of claim 5 further comprising, a graphite-based active material.

7. A secondary battery comprising:
the negative electrode of claim 5;
a positive electrode:
a separator interposed between the positive electrode and the negative electrode; and an electrolyte.

8. A method for preparing a negative electrode active material, the method comprising:
forming a matrix fluid by performing a first heat treatment wherein vaporized silicon source, carbon source, and carrier gas are introduced into a first reaction furnace; and
reacting the matrix fluid and boron in the gaseous state to form a $SiC_x$ matrix doped with boron, wherein
x of the $SiC_x$ matrix is 0.3 or more and less than 0.6, and
wherein the boron is present in an amount of 0.5 wt % to 1 wt % based on a total weight of the silicon-carbon-based particle.

9. The method of claim 8,
wherein in the step of forming of the matrix fluid,
a ratio of an inflow rate of the vaporized silicon source to an inflow rate of the carbon source is 1:0.3 to 1:0.6.

10. The method of claim 8,
wherein the first heat treatment is performed at a temperature range of 1500° C. to 2500° C.

11. The method of claim 8,
wherein the carrier gas is at least one selected from the group consisting of Ar, He, and Ne.

12. The method of claim 8,
wherein the step of forming of a $SiC_x$ matrix doped with boron comprises performing a second heat treatment by introducing the matrix fluid and the boron in the gaseous state into a second reaction furnace.

13. The method of claim 12,
wherein a temperature of the second heat treatment is in a range of 2000° C. to 2800° C.

14. The method of claim 12,
wherein a ratio of an inflow rate of the matrix fluid to an inflow rate of the boron in the gaseous state is 300:1 to 600:1.

* * * * *